US011465337B2

(12) United States Patent
Miller et al.

(10) Patent No.: US 11,465,337 B2
(45) Date of Patent: Oct. 11, 2022

(54) AUTOMATED MANUFACTURE OF 3D OBJECTS FROM COMPOSITE MATERIAL

(71) Applicant: Massivit 3D Printing Technologies Ltd., Lod (IL)

(72) Inventors: Gershon Miller, Rehovot (IL); Igor Yakubov, Herzelia (IL); Moshe Uzan, Bet Shemesh (IL); Erez Zimerman, Nes Ziona (IL); Shai Garty, Rehovot (IL); Nir Dvir, Herzlia (IL)

(73) Assignee: Massivit 3D Printing Technologies Ltd., Lod (IL)

( * ) Notice: Subject to any disclaimer, the term of this patent is extended or adjusted under 35 U.S.C. 154(b) by 0 days.

(21) Appl. No.: 17/523,077

(22) Filed: Nov. 10, 2021

(65) Prior Publication Data

US 2022/0161486 A1    May 26, 2022

Related U.S. Application Data

(60) Provisional application No. 63/116,867, filed on Nov. 22, 2020.

(51) Int. Cl.
| | |
|---|---|
| *B29C 64/118* | (2017.01) |
| *B29C 64/245* | (2017.01) |
| *B29C 64/336* | (2017.01) |
| *B33Y 10/00* | (2015.01) |
| *B29C 64/209* | (2017.01) |
| *B33Y 40/10* | (2020.01) |
| *B29C 64/314* | (2017.01) |

(52) U.S. Cl.
CPC .......... *B29C 64/118* (2017.08); *B29C 64/209* (2017.08); *B29C 64/245* (2017.08); *B29C 64/314* (2017.08); *B29C 64/336* (2017.08); *B33Y 10/00* (2014.12); *B33Y 40/10* (2020.01)

(58) Field of Classification Search
None
See application file for complete search history.

(56) References Cited

U.S. PATENT DOCUMENTS

| | | | | |
|---|---|---|---|---|
| 2015/0290875 | A1* | 10/2015 | Mark | ...................... B33Y 70/00 264/138 |
| 2016/0031155 | A1* | 2/2016 | Tyler | ..................... B29C 70/524 264/129 |
| 2019/0168448 | A1* | 6/2019 | Osiroff | ................. B29C 64/106 |
| 2020/0329814 | A1* | 10/2020 | Wang | ................... A43B 17/003 |

* cited by examiner

*Primary Examiner* — Matthew J Daniels
*Assistant Examiner* — Paul Spiel
(74) *Attorney, Agent, or Firm* — Manelli Selter PLLC; Edward Stemberger

(57) ABSTRACT

Described is a method of manufacture of 3D objects from composite materials. The method includes the use of an extrusion nozzle configured to extrude the composite material, including a multistrand filament with a thixotropic acrylic matrix material surrounding the multistrand filament. Extruding a 3D object surface segment spanning in the air over at least a segment of a discontinuous work surface and operating concurrently a source of curing energy to pin and enhance the strength of a 3D object surface segment spanning in air. The 3D object extruded surface segment spanning in the air is sufficiently rigid and maintains its shape without the use of a mandrel.

8 Claims, 14 Drawing Sheets

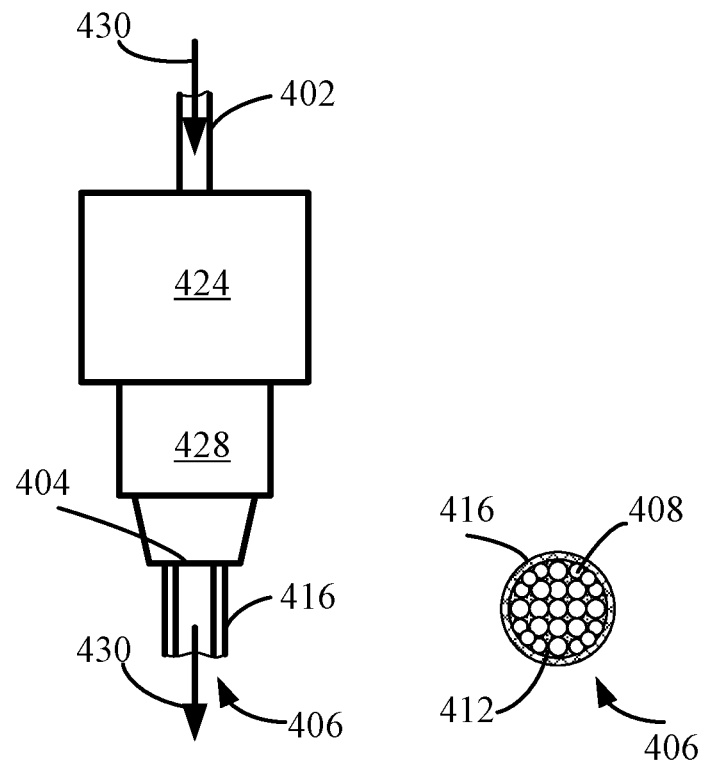
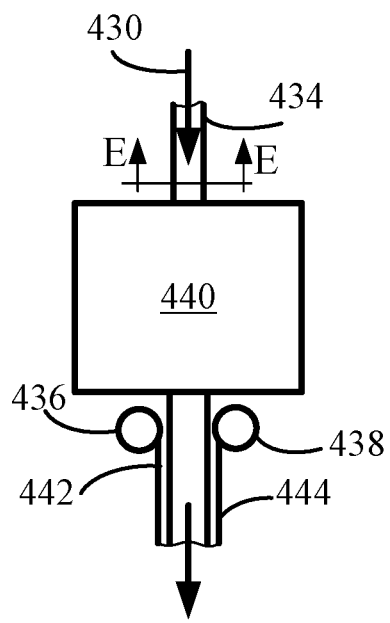
FIG. 4A
FIG. 4B

AUTOMATED MANUFACTURE OF 3D OBJECTS FROM COMPOSITE MATERIAL

The present application claims priority to U.S. Provisional Application No. 63/116,867 filed on Nov. 22, 2020.

TECHNOLOGY FIELD

The method and apparatus relate to the manufacture of 3D objects from composite materials and, in particular, to the automated manufacture of 3D objects.

BACKGROUND

A composite material is a material that includes at least two individual components. Typically, the composite material includes a fibrous reinforcement that could be glass fiber, Kevlar, Carbon Fiber, or others and resin. The resin could be epoxy, polyester resin, polyurethane resin, polyurea resin, vinyl ester, acrylic or any other two components resin system. In mixing and processing the two components, they bond mechanically and chemically and form a laminate part. The composite material's combined physical strength and properties exceed either of the individual material components' properties. The resin may include pigments or dyes and provide the composite material with the desired color, reducing the painting process's need. The most frequently used carbon and glass fiber reinforced composite materials are often referred to loosely as 'composites.'

The composite material is the primary manufacturing material (build material) of 3D objects and, in particular, of large 3D objects.

A labor-intensive wet lay-up process where layers of laminates are layed-up one over the other, combined with liquid resin, and hardened is still the primary large 3D objects manufacturing process. Typically, the large and bulky 3D composite objects are manufactured as two or more parts using a corresponding number of molds. The parts forming a 3D object are joined, a vacuum is then applied, and resin that bonds the matting is injected. Once the resin has hardened, the two or more parts are pieced together to form a 3D object. An infusion technique simplifies the resin introduction and hardening process, but the lay-up is still a manual and labor-intensive process.

Almost all 3D objects and, in particular, large 3D objects are subject to further manufacturing steps. The outer surfaces of the 3D objects could be polished, painted, and coated with varnish. All of the processes are still manual, time-consuming, and costly.

Any composite material manufacturer can produce nearly every composite object if the manufacturer has or can produce a suitable mold or mandrel. The manufacturing steps of 3D objects made from composite materials described above slow down the manufacturing process, increase the manufactured 3D object cost, and waste composite material.

Composite materials are popular for several reasons; they are lightweight and have high strength. The composites have superior resistance to almost all environments. Despite the low weight, environmental stability, and strength advantages of composites, the high cost of labor-intensive and time-consuming manufacturing methods impedes the growth and use of composite materials.

Definitions

Composite material sheet laminating is the process of taking one composite material sheet and laminating it to another composite material sheet to provide additional strength to the material.

Aramid fiber is a blend of the words "aromatic" and "polyamide." Aramid fiber is a general term for a fiber in which at least 85% is of amide linkages (—CO—NH—) attached directly to two aromatic rings.

Complex shaped 3D object means a 3D physical object, including non-planar or curved surfaces that could be convex or concave, flat surfaces, and surfaces that could overhang outside the main body of the object or, in case of a hollow object, protrude into a hollow void or cavity inside the 3D object. The surfaces could be inclined, oriented at different angles, and have different thicknesses or sizes.

Pre-preg is a "pre-impregnated" composite fiber or strand where a thermoset polymer matrix material, such as epoxy or a thermoplastic resin, is already present. The thermoset matrix is partially cured to allow secure handling; this B-Stage material requires certain storage conditions to prevent complete curing.

End face preparation is a process where the end of manufactured composite object segments is prepared for connection with the next composite object segment. End face preparation could include end diameter reduction or expansion, flanging, and chamfering.

Filament—is the smallest unit of fibrous material. Filaments are the basic units formed during drawing and spinning and gathered into strands of fiber for further use.

Filament Winding—is a process for fabricating a composite structure in which continuous reinforcements (filament, wire, yarn, tape, or other), previously impregnated with a matrix material or impregnated during the winding. The filament is placed over a rotating and removable form or mandrel in a prescribed way to meet certain stress conditions.

An end-effector is usually a tool attached to the end of a robotic arm and is the tool that performs the desired function. For example, the function could include material deposition, spray paint, and polish the ready 3D object.

The term robotic arm used in the current disclosure means a mechanical arm with similar functions to a human arm. The term includes a robotic arm, a gantry, a rail/guide with a carriage, and other equivalents capable of picking up and carrying a load.

The term "discontinuous work surface" means a work surface or platform formed by support elements with voids or gaps between them.

SUMMARY

Described is a method of manufacture of 3D objects from composite materials. In one example, the method includes using an extrusion nozzle configured to extrude the composite material. The composite material could include a multistrand filament with a thixotropic acrylic matrix material surrounding the multistrand filament. The method further includes extruding a 3D object surface segment spanning in the air over at least a segment of a discontinuous work surface and operating concurrently a source of curing or hardening energy to pin and enhance the strength of a 3D object surface segment spanning in air. The 3D object extruded surface segment spanning in the air is sufficiently rigid and maintains its shape without the use of a mandrel.

A discontinuous work surface formed by individually adjustable support columns terminated by a receiving surface configured to accept the desired orientation in space supports the manufactured 3D object. One or more robotic arms move and operate suitable pick-up end-effector tools to perform a plurality of operations in the manufacture of the 3D object.

In one example, the 3D object is manufactured in layers, and each layer of the 3D object could be extruded from a different material. In some examples, one or more ribs supporting the 3D object surface segment spanning in the air could be extruded concurrently with surface segments extrusion.

In some examples, a metallic or polymeric grid distributed over the adjustable support platform serves as a substrate for the 3D object composite material deposition.

The method of manufacture of 3D objects from composite materials includes the manufacture of an enhanced multistrand filament with a thixotropic acrylic matrix material surrounding the multistrand filament. The multistrand filament could be in a shape of a cylinder, oval, hexagonal, or flat strip. Different multiple coatings could be deposited on the sides of the multistrand filament. The multiple coatings could include different materials.

Disclosed is also an apparatus for the manufacture of 3D objects from composite materials. The apparatus includes an adjustable support platform formed by a plurality of individually adjustable support columns and at least one robotic arm configured to operate a plurality of end-effector tools. The end-effector tools could be a material extrusion nozzle, a grid spreading arrangement, a painting brush, a polishing tool, and others, as the manufacturing process could require it.

LIST OF FIGURES AND THEIR SHORT DESCRIPTION

To understand the apparatus and method and to see how could be carried out in practice, examples will now be described, by way of non-limiting example only, with reference to the accompanying drawings, in which identical referral numbers mean identical or similar parts:

FIG. 4A is an example of on-site preparation of a composite multistrand filament;

FIG. 4B is another example of on-site preparation of a composite flat multistrand filament;

DESCRIPTION

Despite the weight, environmental stability, and strength advantages of composites, the high cost of tooling, labor-intensive, and time-consuming manufacturing methods impede the growth and use of composite materials. The availability of a low-cost manufacturing process that would significantly reduce the labor-intensive operation, alleviate the need for a mandrel or mold, and maintain the manufactured object quality would rapidly advance the industry.

The present document discloses an automated method and apparatus to manufacture almost any complex-shaped three-dimensional objects from composite material. The automated manufacturing method applies to sculptures, exhibition exponents, wind rotor blades manufacture, wing, and boat manufacture. The suggested method would reduce the manufacturing cost and provide a better degree of 3D object profile precision.

The document also discloses a multistrand filament preparation with a thixotropic acrylic matrix material surrounding the multistrand core. A coating of the extruded multistrand core by a thixotropic acrylic material supports almost instant hardening of the combined multistrand material and simplifies the curing process.

The document further discloses a method and apparatus for large 3D objects manufacture applicable to the manufacture of the 3D objects on the object installation site.

The Apparatus

Figure 1:
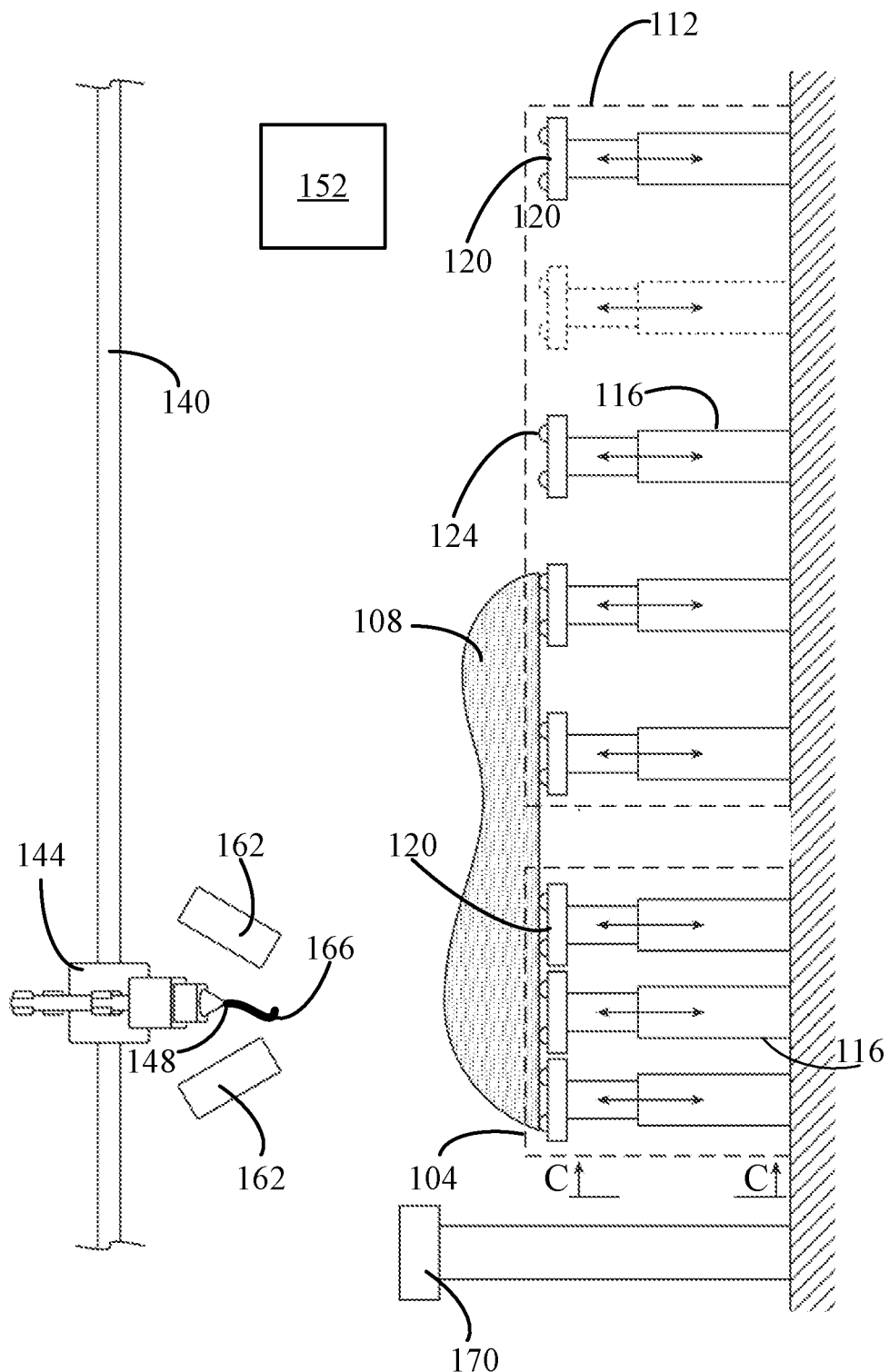
FIG. 1 is a side view of an example of the present apparatus for manufacturing a complex-shaped 3D object from composite material.

FIG. 1 is a side view of an example of an apparatus for manufacturing a 3D object from composite material. Apparatus 100 includes an adjustable support platform 104 configured to support a manufactured 3D object, for example, a complex shaped 3D object 106 placed on the adjustable support platform. A plurality of individually adjustable support columns 116 terminated by a receiving surface 120 generate the plane or, as it will be shown below, a non-planar or curved surface of adjustable support platform 104. The distance between receiving surfaces 120 of adjustable support columns 116 or the frequency of the location of adjustable support columns 116 could be different along with apparatus 100. The distance between adjustable support columns 116 in segment 108 of adjustable support platform 104 could be shorter (higher frequency) than between the adjustable support columns 116 in segment 110 (lower frequency) of adjustable support platform 104.

Receiving surface 120 of adjustable support columns 116 could be populated by rotating spherical bodies 124, facilitating object 106 repositionings.

The distance between receiving surfaces 120 with inserted rotating spherical bodies 124 of adjustable support columns 116 is selected to support a minimal sag of the surfaces of a complex-shaped 3D object 106 (FIG. 1).

When long complex-shaped 3D objects, for example, wind rotor blades, or the body of a canoe, have to be manufactured, their dimensions could exceed the reasonable (three to five meters) dimensions of an adjustable support section 104.

Segment 110 of the adjustable support platform of apparatus 100 is arranged to support the hanging over the adjustable support platform 104 portions of an extended or protracted complex shaped 3D object 106. Adjustable support columns 116 configured to move along Z-axis and include a receiving surface 120 accepting the hanging over adjustable support platform 104 segments of long object 106. Receiving surface 120 could be rotated in a range of almost 340 degrees (FIG. 2) in any direction concerning symmetry axis 204 (Z-axis) such that any receiving surface 120 of adjustable support columns 116 could support any curved 3D object in every place on the adjustable support platform. In some examples, the adjustable support columns 116 with their receiving surfaces 120 could be repositioned to meet specific complex shaped 3D object manufacturing requirements.

The distance between receiving surfaces 120 with inserted rotating spherical bodies 124 of adjustable support columns 116 is selected to support a minimal sag of the surfaces of the 3D object 108 (FIG. 1). In some examples, rotating cylinders replace rotating spherical bodies 124. Motors could be connected to the rotating cylinders and could operate the cylinders to assist in repositioning a complex-shaped 3D object, such as the rotation of the manufactured 3D object.

Apparatus 100 could include a guide or rail 140. At least one robotic arm 144 could be attached or travel along with guide 140. Typically, the guide supports the robotic arms movement along with the longest dimension of the complex shaped 3D object. One or more robotic arms 144 could be configured to perform different operations. For example, carry a composite material extrusion nozzle 148, a paint spraying head, 3D object polishing device, and others required. Robotic arm 144 moves the composite material extrusion nozzle 148 and other end-effectors (tools) connected to robotic arm 144 in three directions or axes (X, Y, and Z). Robotic arm 144 supports rotation of the end-effectors around each of the three axes.

In some examples, apparatus 100 could include multiple robotic arms with at least one robotic arm operating from the bottom side of sections 108 and 110 of adjustable support platform 104. Repositioning of adjustable support columns 116 in specific places required by the operation from the bottom side could facilitate the operation of a robotic arm accessing sections 108 and 110 of adjustable support platform 104 from the bottom.

In the course of material extrusion, adjustable support platform 104 supports the manufactured 3D object. The width of the adjustable support platform 104 sets at least one dimension of the 3D object. In the present case, the width of the adjustable support platform 104 could be one to four-meter wide. The number of adjustable support columns and the distance between them could be used to regulate the length of the manufactured 3D object.

One or more curing radiation sources 162 could accelerate the curing of extruded filament 166. Some examples of apparatus 100 (FIG. 1) could include multiple means for curing the extruded material. An example of curing sources might be multiple ultraviolet radiation sources 162 placed in proximity to the extrusion nozzle. In a further example, the curing radiation sources could be arranged to direct the radiation on the just extruded elements of the 3D object. In some examples, curing or hardening radiation sources operate concurrently with the material extrusion to pin and enhance the 3D object surface strength.

A laser beam or other optical alignment instruments 170 could be employed for alignment and calibration of the receiving surfaces 120 of adjustable support columns 116. The feature facilitates general alignment and calibration for off-site (in the field) 3D object manufacturing installations of apparatus 100.

Figure 3:
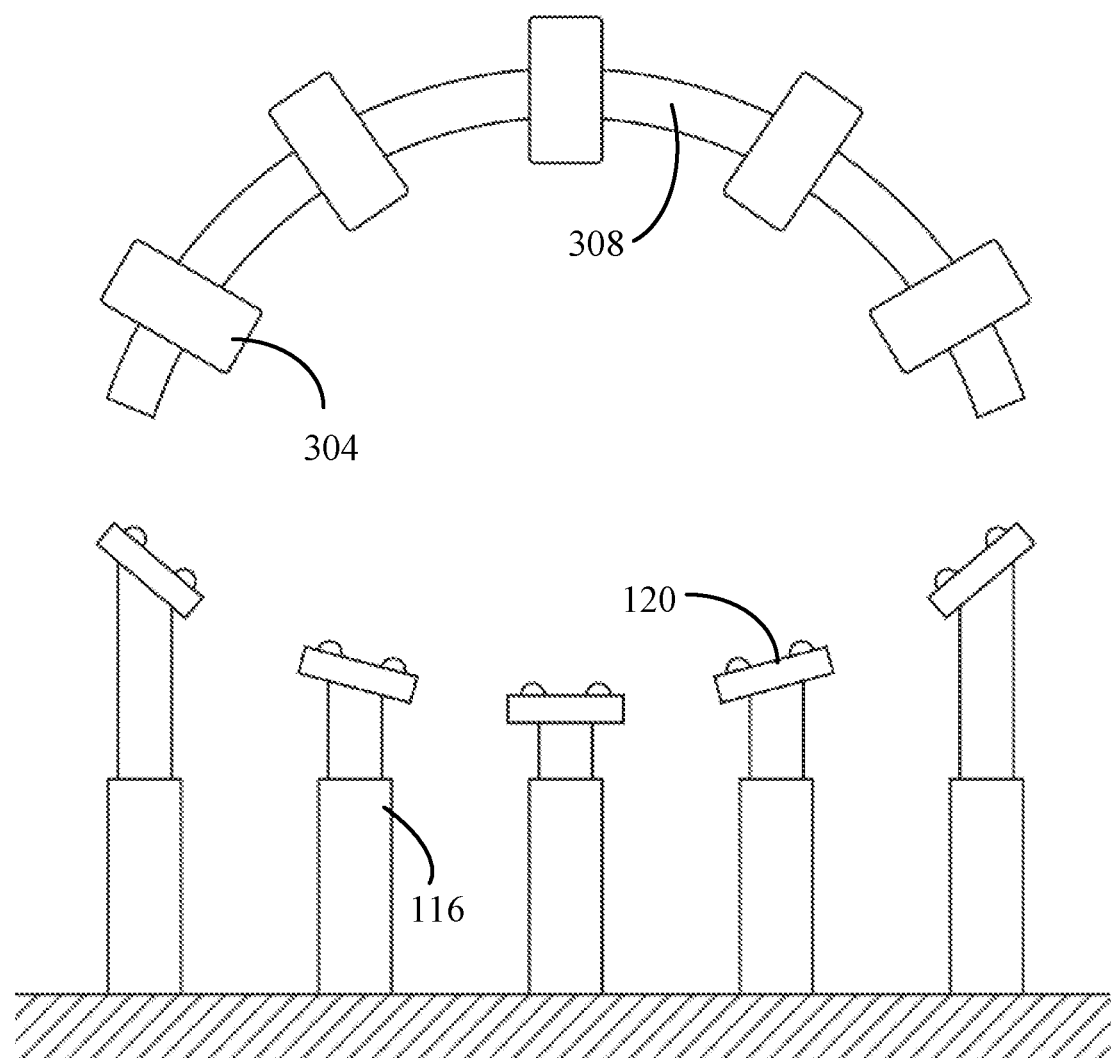
FIG. 3 is an example illustrating a heat curing arrangement of the apparatus of FIG. 1.

Heat could cure or harden some of the extruded materials. Apparatus 100 could include several IR sources 304 (FIG. 3) or even simple heaters arranged to heat the just extruded elements of the 3D object. The IR sources 304 could be arranged on a bridge-type holder 308 moved by a robotic arm along the manufactured 3D object. Alternatively, the IR sources 304 could be placed on a gantry carrying the IR sources along with the manufactured complex shaped 3D object.

Extrusion

FIG. 4A is an example of an extrusion nozzle 404 configured to extrude an enforced multistrand filament prepared in a mode similar to the one disclosed in the U.S. Patent Application Publication No. 2014/0328964, Patent Cooperation Treaty Publication WO2019/245363, and European Patent No. 3 231 592. In one example, a reinforced multistrand filament 406 is prepared on the manufacturing site where the manufacture of the 3D object takes place. Alternatively, an earlier prepared or purchased third-party multistrand filament (prepreg) 402 could be used. The enforced multistrand filament could be of round, elliptical, rectangular, or other cross-sections. In one example, the reinforced filament 406 (FIG. 4A) comprises a multistrand core 408, a volume of matrix material 412 surrounding the multistrand core, and an additional coating 416 supporting a rapid solidification of the reinforced filament 406. Additional coating 416 also makes the surface of the multistrand reinforced filament 406 smooth. Core 408 of the reinforced filament could be one of a group of materials consisting of glass fiber, carbon fiber, aramid fiber, or Kevlar strands. The filament matrix 412 could be a polymer such as one of a group of materials consisting of a du-component epoxy, fast curing epoxy, polyester resin, or vinyl ester. The epoxy components are combined in a mixing chamber 424 before extrusion and extruded with the multistrand core or filament.

In a further example, the reinforced filament 406, which could be a prepreg material, comprises an additional coating layer 416 surrounding the matrix material. The additional coating material could be, for example, a cationic curable epoxy, an acrylic thixotropic material supporting the rapid solidification of reinforced filament 406.

In the current disclosure, the reinforced multistrand filament 406 further passes through another coating system 428. The coating system 428 is coating the original multistrand filament 402, with a layer of thixotropic acrylic material 416. The thixotropic material supports almost instant hardening of the reinforced and coated filament 406. The thixotropic material could be Dimengel, a proprietary photo polymeric material available from the present application assignee. Arrows 430 show the direction of the multistrand filament advance.

In a further example, the multistrand filament is prepared as a flat strip 434 (FIG. 4B). Strip 434 could be prepared earlier as a prepreg and fed through two rollers 436 and 438. The flat strip's advantage is that it could be coated on each side 442-444 of the strip by different coating/material, and each of the coated layers could be of different thickness forming flat strip 434-1. For example, side 442 could be coated by a fast curing or du-component epoxy, and side 444 could be coated by a thixotropic material. Strip 434-1 could be prepared on the 3D object manufacturing site by providing a multistrand core and a coating system 440.

The fast curing epoxy could be a cationic curable epoxy supporting rapid solidification of the reinforced filaments in the shape of a cylindrical, oval, or flat strip. The thixotropic material could be a material such as Dimengel commercially available from the assignee of the present application.

As explained earlier, the core of the filament 434 could be one of a group of materials consisting of glass fiber, carbon fiber, aramid fiber, or Kevlar strands.

Figure 2:
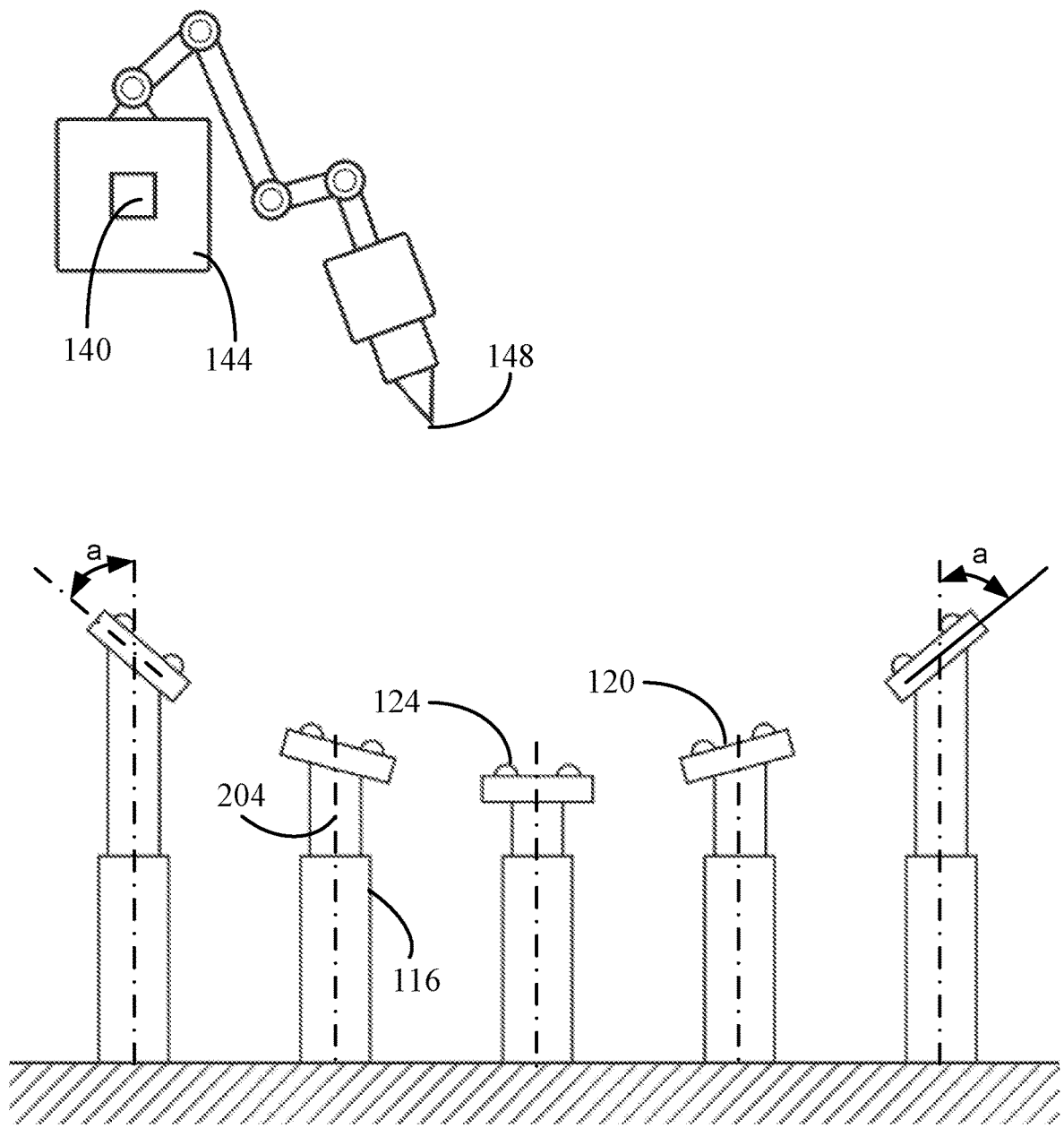
FIG. 2 is a cross-section along lines C-C of FIG. 1.
Figure 4C:
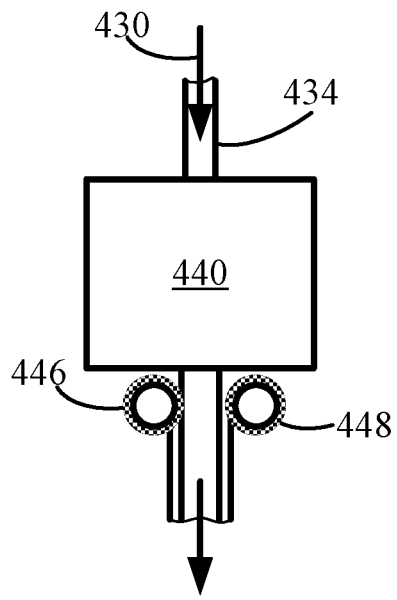
FIG. 4C is a further example of on-site preparation of a composite flat multistrand filament.
Figure 4D:
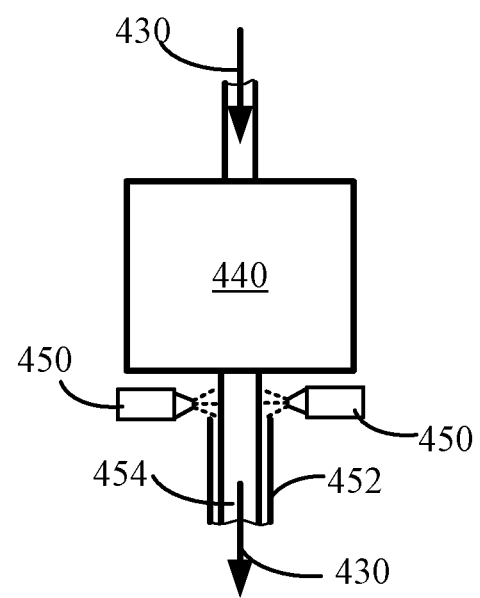
FIG. 4D is an additional example of on-site preparation of a composite flat multistrand filament.
Figures 1, 4E:
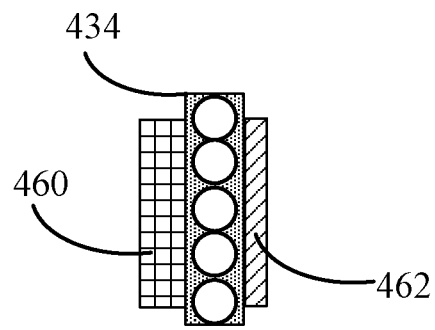
FIG. 4E is an example of on-site preparation of a composite flat multistrand flat strip coated with layers of different thicknesses on the same side of the strip.
Figures 2, 4E:
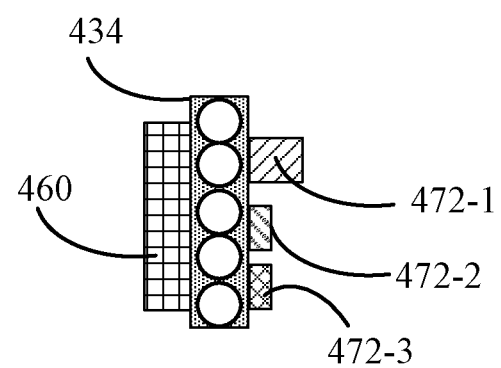

FIG. 4C illustrates a brush coating system, where each brush 446-448 could coat opposite sides of flat strip 434 with identical or different material. Similarly, a filament with an oval or other cross-section could be coated on opposite sides. FIG. 4D illustrates a spray coating system, where a material spray nozzle 450 sprays a different material 452 or 454 on the opposite sides of the flat strip. FIG. 4E-1 are examples of flat strips coated by different methods forming layers 460 and 462 of different thicknesses. FIG. 4E-2 illustrates an example where one or more inkjet nozzles deposit on the same side of a flat strip 434 different materials 472-1, 472-2, and 472-3. The deposited materials could be of the same or different thicknesses.

Extrusion nozzle 404 (FIG. 4A) extrudes the reinforced and coated by the thixotropic acrylic material multistrand filaments 406, 434-1, and others to form the flat and non-planar or curved segments of 3D object 108 (FIG. 1). U.S. Pat. No. 10,639,846 to the same assignee and inventor discloses a multi-nozzle extrusion apparatus where each of the extrusion nozzles operates independently from other extrusion nozzles. The apparatus supports the simultaneous printing of different segments of 3D object 108 or a similar object.

Other sizes and shapes of the nozzle cross-section, for example, hexagonal, square, oval, and rectangular, could be used according to particular 3D object requirements. The diameter of the extrusion nozzle 404 (FIG. 4A) would typically be 2.0-2.5 mm. The rectangular or oval nozzle could be 1.0-2.5 mm wide and 5.0-10.0 mm long, although other larger or smaller sizes are possible. The nozzle could be interchangeable, allowing apparatus 100 (FIG. 1) to manufacture parts with different structure surfaces.

The feed rate at which the multistrand filament 406 and other reinforced filaments are extruded or coated could also regulate the coating thickness. In one example, the use of multiple extrusion heads is envisioned. Multiple feeders could operate to extrude multiple strands to feed multiple extrusion heads. Apparatus 100 could alternate between multiple feeders and apply different multistrand filaments to different segments of a 3D object.

Additional Units of the Apparatus

Figure 5:
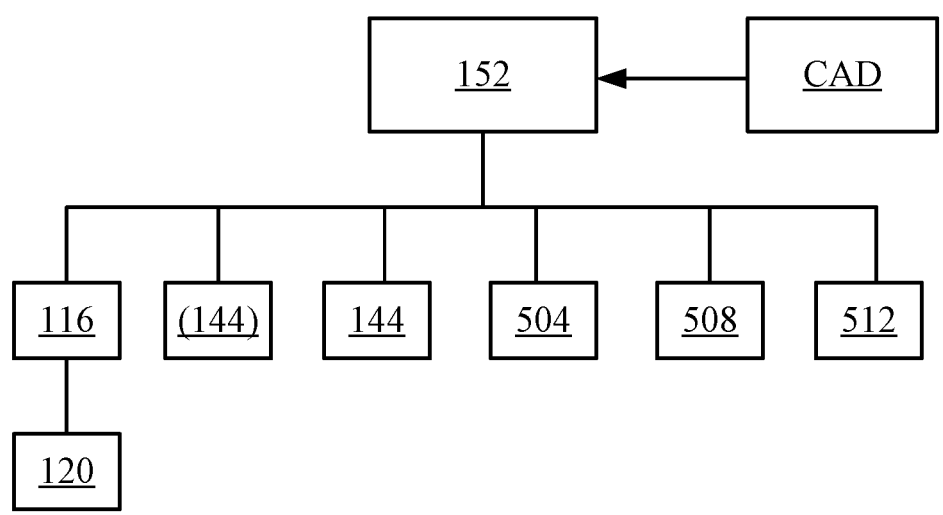
FIG. 5 is a block schema illustrating control and operation of additional units of the present apparatus.

FIG. 5 is a block schema of additional units of apparatus 100, their control and operation. Apparatus 100 includes a control computer 152 that governs the operation of apparatus 100 (FIG. 1). A CAD system provides control computer 152 the contour (profile) and length of a 3D object to be manufactured, for example, 3D object 106. Computer 152 adjusts the angle and height of receiving surfaces 120 of adjustable support columns 116 (FIG. 1) to match the outline curvature (profile) and length of a 3D object 106. Control computer 152 controls one or more robotic arms 144 operations, material trough nozzle 148 extrusion rate, curing energy level, and other 3D object manufacturing parameters.

Control computer 152 controls robotic arms of a 3D object polishing device 504, a paint spraying device 508, varnish depositing device 512, and others as required. Robotic arm 144 or similar moves the extrusion nozzle 148 and other end-effectors (tools) connected to the robotic arm in three directions or axes (X, Y, and Z) and supports rotation of the end-effectors.

Control computer 152 could be configured to control a plurality of robotic arms 144 simultaneously; for example, several robotic arms configured to control the movement and extrusion of different materials through different nozzles; simultaneous painting of different surface segments of the 3D object and others.

Robotic Arm

A robotic arm is a chain of links that are moved by joints actuated by motors. An end-effector is usually attached to the end of the chain. End-effector is the tool that performs the desired function. The robotic arm moves the end-effector from place to place. The current description discloses the use of several end-effectors tools suited to deposit the extruded material, spray paint, assist in changing the manufactured 3D object's orientation, and polish the ready 3D object. The robotic arm is configured to operate a plurality of exchangeable end-effector tools. Several robotic arms could simultaneously operate several end-effector tools.

Figure 8A:
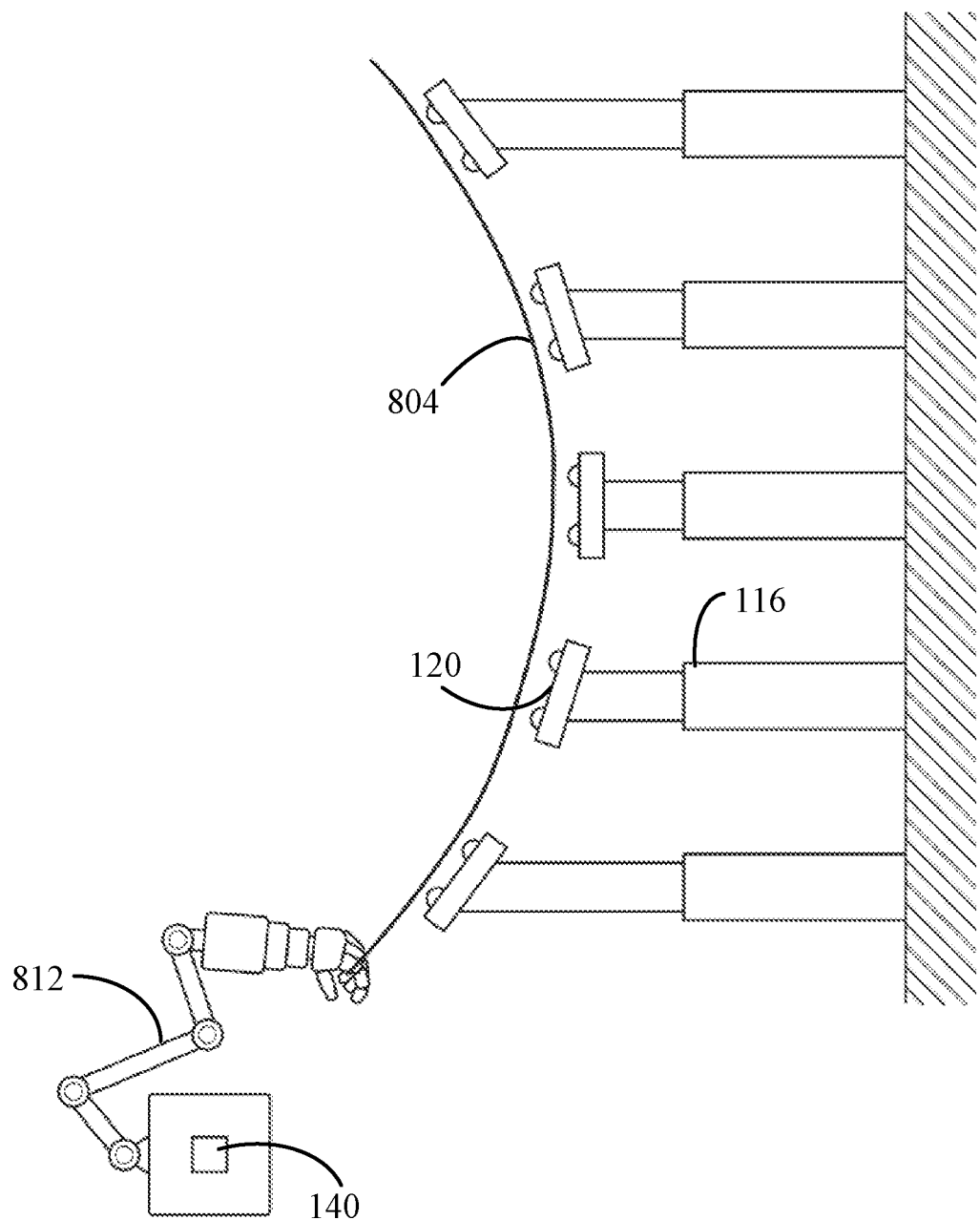
FIG. 8A illustrates a method of manufacture of a 3D object using a support grid.

U.S. Pat. Nos. 8,974,213, 9,162,391, and 9,527,243 all to the assignee of the present application, disclose a method of strengthening a 3D object by inserting a metallic or polymeric net or grid between the extruded layers. In another example, a robotic arm 144 or similar with a suitable pick-up end-effector tool could be set to pick-up and spread a metal or polymeric grid (net) 804 (FIG. 8) over receiving surfaces 120 of adjustable supports 116. Such a grid with properly selected mesh provides a convenient substrate for the deposing of extruded material.

Robotic arms could have built-in pressure sensors, vision sensors, and others that provide the computer 152 with the desired feedback and coordinate the robotic arm movements.

In the present disclosure, one or more robotic arms are mounted on a rail or guide 140. In some examples, a central motor displaces the robotic arms. In other examples, where more than one robotic arm is mounted on rail 140, a dedicated to each robotic arm motor could displace each robotic arm. At least one collision detection sensor is operative to provide the computer governing a robotic arm displacement about a potential collision.

Robotic arm 144 is configured to reach every point on the adjustable support platform's surface, 104 discontinuous support surface, and maintain nozzle 148, always perpendicular to the extruded 3D object' surface segment. Nozzle 148 mounted on robotic arm 144 could rotate around each of X, Y, and Z axes at least 180 degrees. The use of a robotic arm holding nozzle 148 supports an entire ark/rib (FIG. 7A) extrusion at a single set-up.

In the course of the composite material 3D object manufacture, robotic arm 144 moves the extrusion nozzle 148 across and along the rail or guides 140. The extrusion nozzle 148 deposits the reinforced filament (FIGS. 6 and 7) at different angles relative to the adjustable platform 106 (FIG. 6) and adjustable supporting surfaces 120. The reinforced filaments are applied to the 3D object in a spiral pattern. The spiral angle can be adjusted to deposit as many spirals as it takes to make a continuous layer.

At least one layer of the reinforced filaments using the fast curing epoxy matrix could be applied to the 3D object in a spiral pattern to form a continuous surface. A multistrand filament with a matrix of a du-component epoxy could form the subsequent layers of the 3D object. Such 3D object structure provides the 3D object with additional strength. Other changes and replacements of materials from layer to layer to get optimal results strength are within the disclosure scope.

Examples

Figure 6:
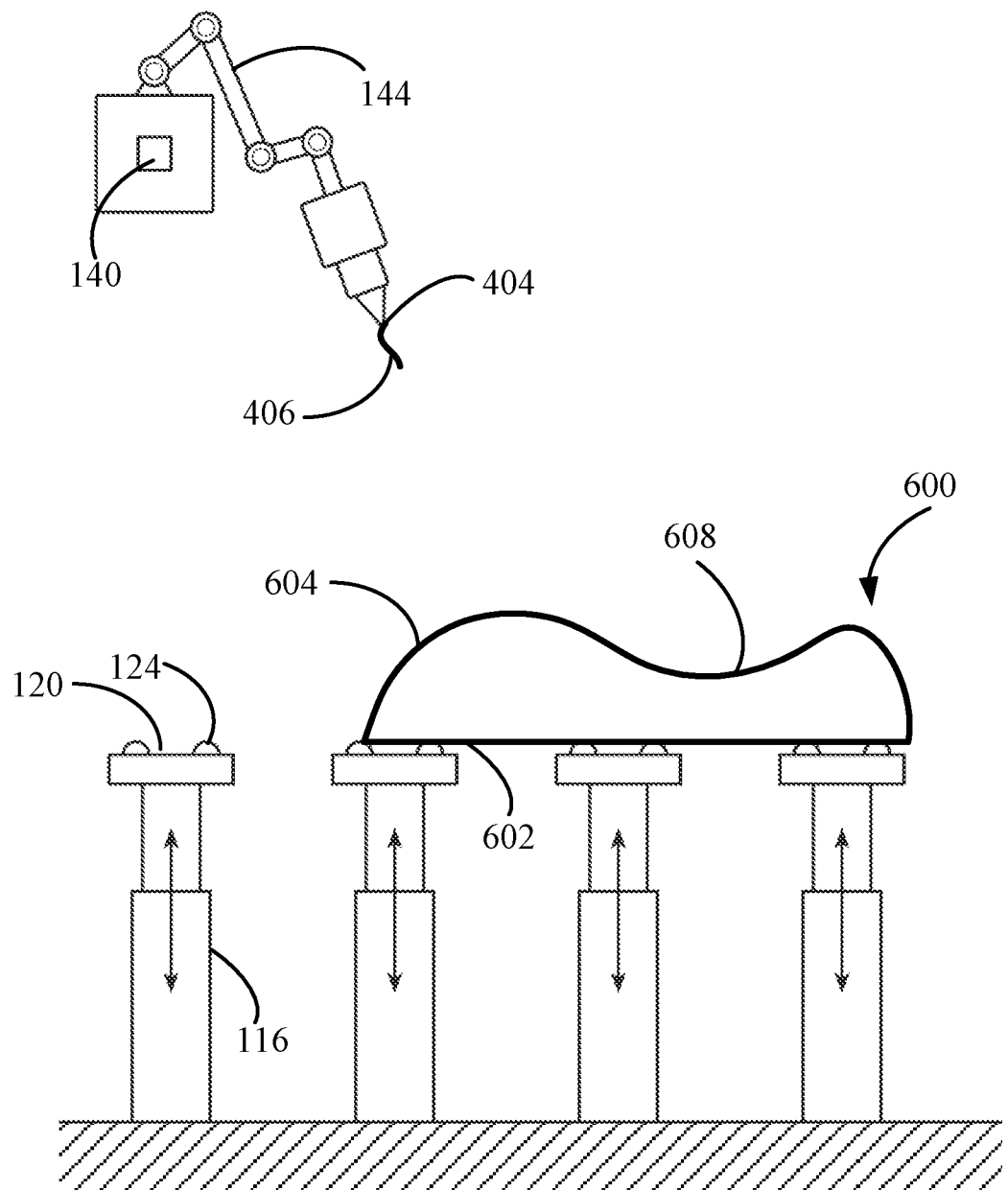
FIG. 6 is an example of a method of manufacture a 3D object, including a convex and concave surface segment from composite material.

FIG. 6 is an example of a method of extruding a 3D object 600 made from composite material. 3D object 600, including a convex 604 and a concave 608 surface segments. All surface segments of 3D object 600 terminate on the same level and form a plane or flat surface 602 of a 3D object 600 on the adjustable support platform 106. A CAD system provides control computer 152 the information concerning 3D object 600. Control computer 152 operates to level all receiving surfaces 120 of support columns 116 and form a flat surface of an adjustable support platform.

Apparatus 100 (FIG. 1) extrudes the composite material to form arks of a convex 604 and concave 608 surface segments. The arks of a convex 604 and concave 608 surface segments are connected to the adjustable support platform 106. In another example, a strip of composite material forming flat surface 602 could create a strong closed contour. Extruded material, for example, a thixotropic acrylic material hardens immediately after leaving nozzle 404, and strips of material forming flat surface 602, convex 604, and concave 608 surfaces become rigid enough not to deform under their weight. The 3D object surface segments 604 and 608 formed by the extruded composite material spanning in the air are rigid enough and remain suspended in the air. No mandrels were used in the manufacture of the 3D object surface segments 604 and 608.

In another example, apparatus 100 extrudes a strip of material to form the contour of flat surface 602. Apparatus 100 (FIG. 1) continues to extrude the arks of a convex 604 and concave 608 surface segments connected to the contour of flat surface 602.

Strips of material forming a segment of flat surface 602 are a type of intermediate supports strengthening the contour of 3D object 600 and may not be printed at every pass.

A robotic arm 144 moves extrusion nozzle 404 in three directions or axes (X, Y, and Z) and supports rotation of extrusion nozzle 404 around each of the three axes. In the course of the movement, nozzle 404 extrudes reinforced and coated filament 406 to form at least a segment of the 3D object 600. In some examples, a curing or hardening energy source operates concurrently with material extrusion to pin and enhance a 3D object surface's strength.

When one extrusion nozzle operates, the segments of 3D object 600 are extruded sequentially. U.S. Pat. No. 10,639,846 to the same assignee and inventor discloses a multi-nozzle extrusion apparatus where each of the extrusion nozzles operates independently from other extrusion nozzles. Such apparatus supports the simultaneous printing of different segments of 3D object 600. According to the present manufacturing method, the manufacture of a 3D object 600 does not require mandrels or molds.

Apparatus 100 could support the manufacture of a 3D object 600 as an assembly of layers. The layers could be layers of different materials. For example, one of the layers could be manufactured using a fast curing epoxy and another layer using a du-component epoxy. Apparatus 100 with a single extrusion head would extrude the different layers sequentially. Apparatus with multiple extrusion heads could extrude layers from different materials simultaneously.

U.S. Pat. No. 10,328,635 to the same assignee discloses a method and apparatus for the manufacture of 3D objects. For multiple identical 3D objects, apparatus 600 could be configured to use a proper material and manufacture a mold. The mold could be used for the manufacture (casting) of identical 3D objects. The disclosed method saves identical 3D objects manufacturing time and reduces their manufacturing cost.

Figure 7A:
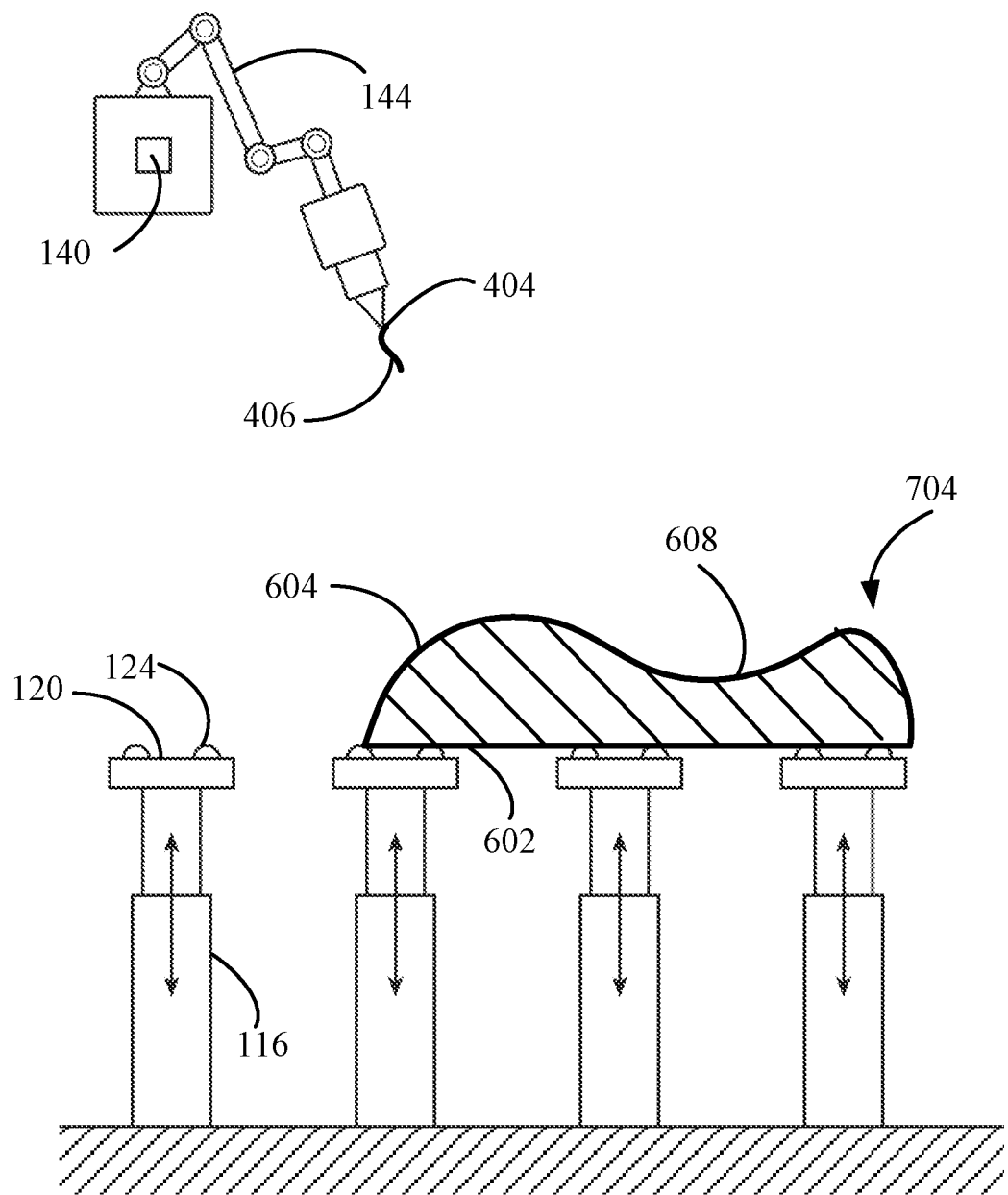
FIG. 7A is another example of a method of manufacture of a 3D object, including a convex and concave surface segment from composite material.
Figure 7B:
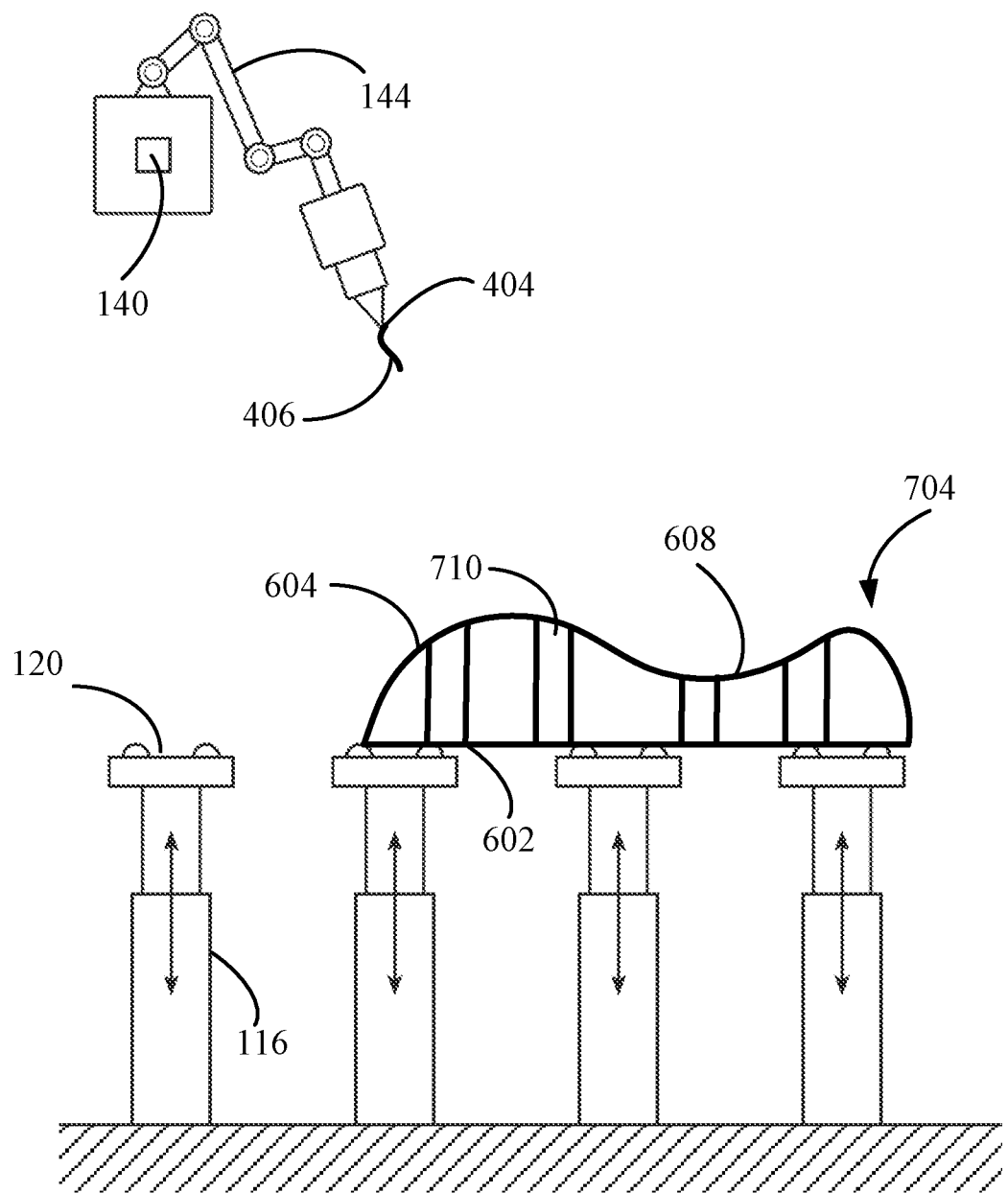
FIG. 7B is an additional example of a method of manufacture of a 3D object, including a convex and concave surface segment from composite material.

FIG. 7A is another example of a method of manufacture of a 3D object, including a convex and concave surface segment from composite material. The strength of long 3D object surface segments with a height exceeding 50 mm and spanning across discontinued or discrete adjustable platform surface 104 could be enhanced by adding internal support walls or ribs 704. Internal support ribs 704 could be printed simultaneously with convex 604 and concave 608 segments of 3D object 600. Internal support walls or ribs (FIG. 7) follow the contour of the 3D object. In some examples, ribs or walls 704 could be manufactured to present a complete 3D object cross-section, i. e., spread around 360 degrees. Ribs 704 spreading around 360 degrees could support 3D object repositioning, for example, rotation of the 3D object.

Internal support walls (FIG. 7B) could be a set of columns 710 or other shapes. Openings supporting the introduction of cables or tubes could be produced in the support walls or entered between columns 710. The locations and frequency of internal support walls and columns positioning could be selected to maintain the integrity of the manufactured 3D object.

In another example, when the 3D object has no flat surfaces, apparatus 100 could initiate 3D object manufacture by employing a robotic arm 812 or another robotic arm to spread a metal or polymeric grid (net) 804 over relevant receiving surfaces 120 of adjustable support columns 116. Such a grid with properly selected mesh provides a convenient substrate for the deposing of extruded material.

Figure 8B:
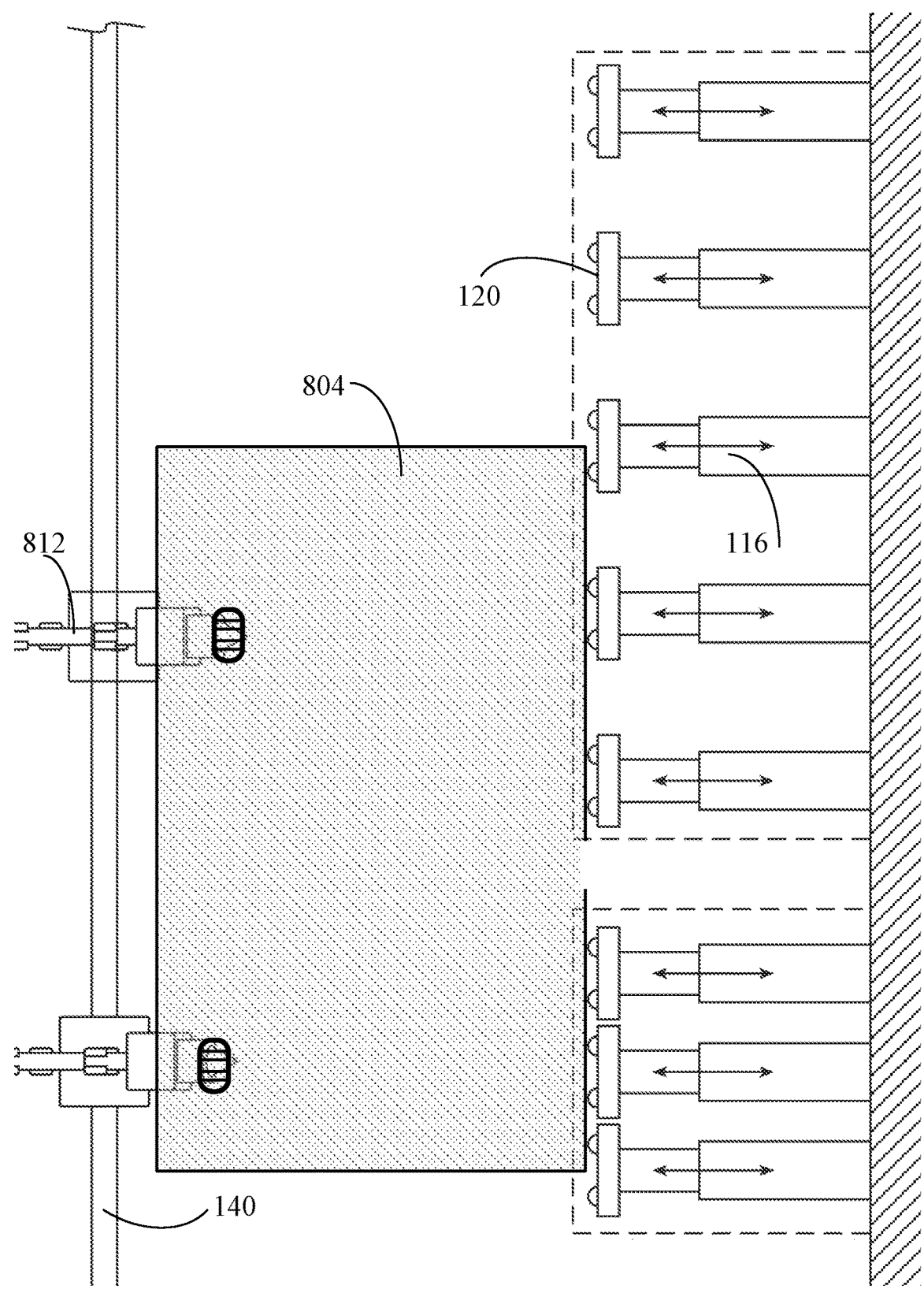
FIG. 8B is an additional view of the method of manufacture of a 3D object using a support grid.

Control computer 152 (FIG. 1) receives the 3D object data from a CAD system and operates to place all receiving surfaces 120 of support members 116 to match the curvature and length of the manufactured 3D object. The use of net or grid 804 supports the extrusion of any 3D object shapes. FIG. 8B illustrates the spread of a grid substrate 804 by robotic arms 812.

A robotic arm moves extrusion nozzle 404 in three directions or axes (X, Y, and Z) and supports the rotation of extrusion nozzle 404 around each of the three axes. In the course of the movement, nozzle 404 extrudes reinforced and coated filament 406 to form at least a part of the 3D object. The manufactured 3D object could include convex or concave surface segments.

In both examples, shown in FIGS. 6 and 7, the manufactured 3D objects could include some internal structures enhancing the 3D object's strength and functional elements. Composite materials with controlled porosity structures, like a honeycomb, are known to enhance a 3D object's strength. For example, the extruded controlled porosity structures could have a variable pitch and height of the cell wall. For example, in the case of a wind rotor blade, the spar sections could have a honeycomb structure changing the pitch along the blade's length.

Figure 9:
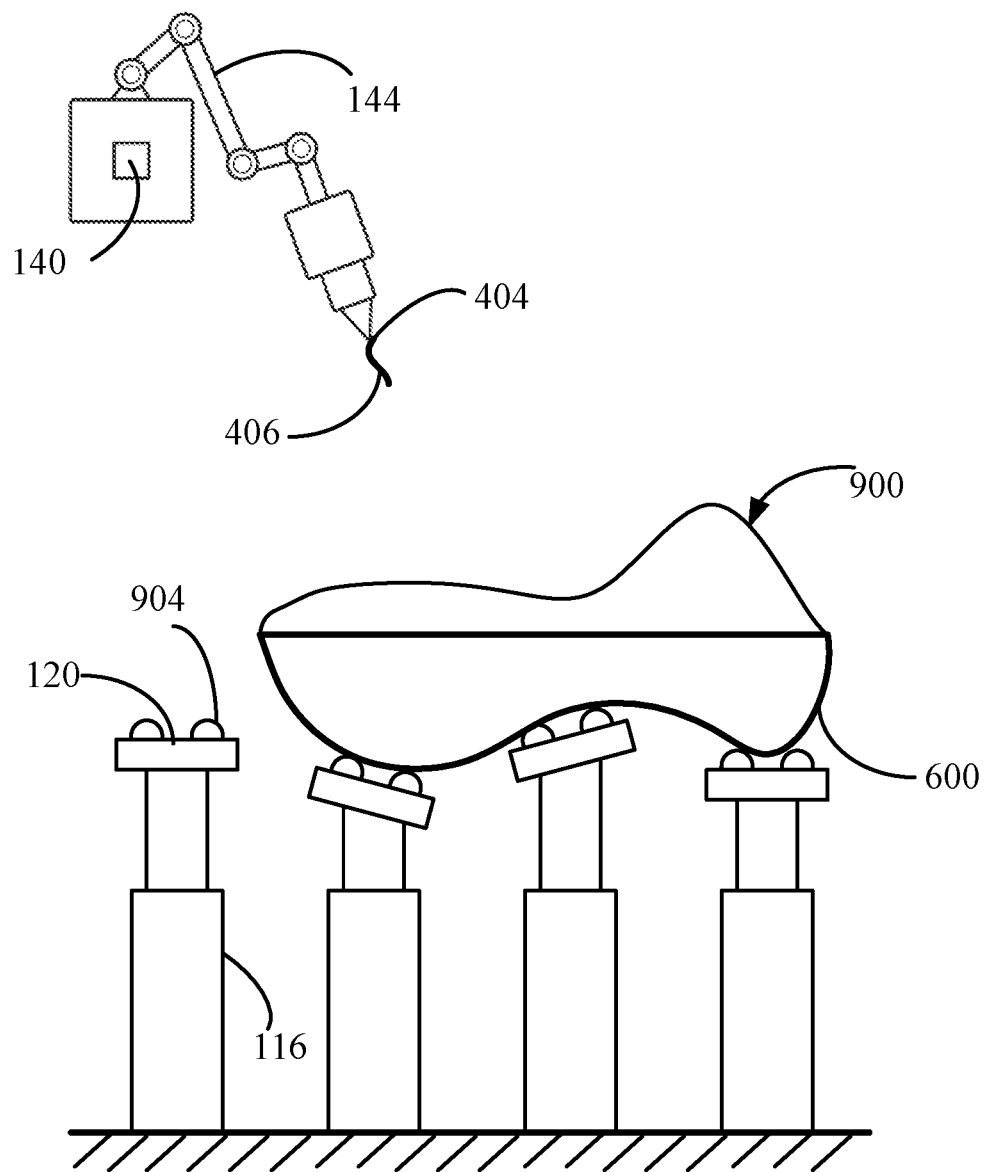
FIG. 9 is an illustration of the 3D object of FIG. 6 rotated for printing the second side of the 3D object.

Upon completion of the manufacture of the 3D object made of composite material, the 3D object 600 (FIG. 9) could be repositioned, for example, turned 180 degrees about one of the sides of the 3D object. 3D object rotation could be accomplished by proper adjustment of support columns 116 and the use of robotic arms. Additional convex or concave segment 900 directed opposite the arks 604 and 608 of the object 600 could be manufactured.

Upon completion of the 3D object manufacture, the almost finished 3D object assembly has to be polished. One or more robotic arms holding pads with sandpaper could be activated to polish the outer surfaces of a complex-shaped 3D object 1000. In a similar manner, a robotic arm could be used to manipulate a paint spraying device and paint and cover by varnish the surfaces of the wind rotor blade.

Apparatus 100 (FIG. 1) is suitable for manufacture three-dimensional objects with a cross-section of a conventional airfoil profile. Airfoils are profiles of airplane wings, wind turbine blades, and other 3D objects and include a convex surface and a concave surface. Airfoils and canoes are relatively long objects. The current manufacturing method also suggests the manufacture of such long 3D objects by cutting the objects into sections, manufacture each section separately, and connecting them into one long 3D object. Following proper end face preparation, the strength of the connection areas could be enhanced by the use of a grid, filament winding, and extruding a stronger material.

U.S. Pat. Nos. 8,974,213, 9,162,391, and 9,527,243 disclose a method of strengthening a 3D object by inserting a metallic or polymeric net or grid between the extruded layers. The 3D objects printed by the methods described in the patents spread the grid over flat surfaces or surfaces with a homogenous curvature. Object 600 has segments 604 with positive curvature 604 and negative curvature 608. In one example, the grid could be segmented according to the manufactured 3D object segments. A different pitch and direction filament winding could be applied to different 3D object segments in another example.

In one example, a 3D object could be manufactured as a single solid object. In another example, a large segment, e.g., a half (FIG. 6), of the 3D object is manufactured. For the manufacture of other surface segment/s, 3D object 600 could be repositioned, for example, rotated, to facilitate other surface segments 900 (FIG. 9) manufacture. Change in the angle of receiving surfaces 120 (FIG. 6) supports rotation of 3D object 600 rotated for printing the second side of the 3D object. Change in position of receiving surface 120, operation of rollers, use of robotic hand, and similar could assist in the process of 3D object reposition.

Figure 10:
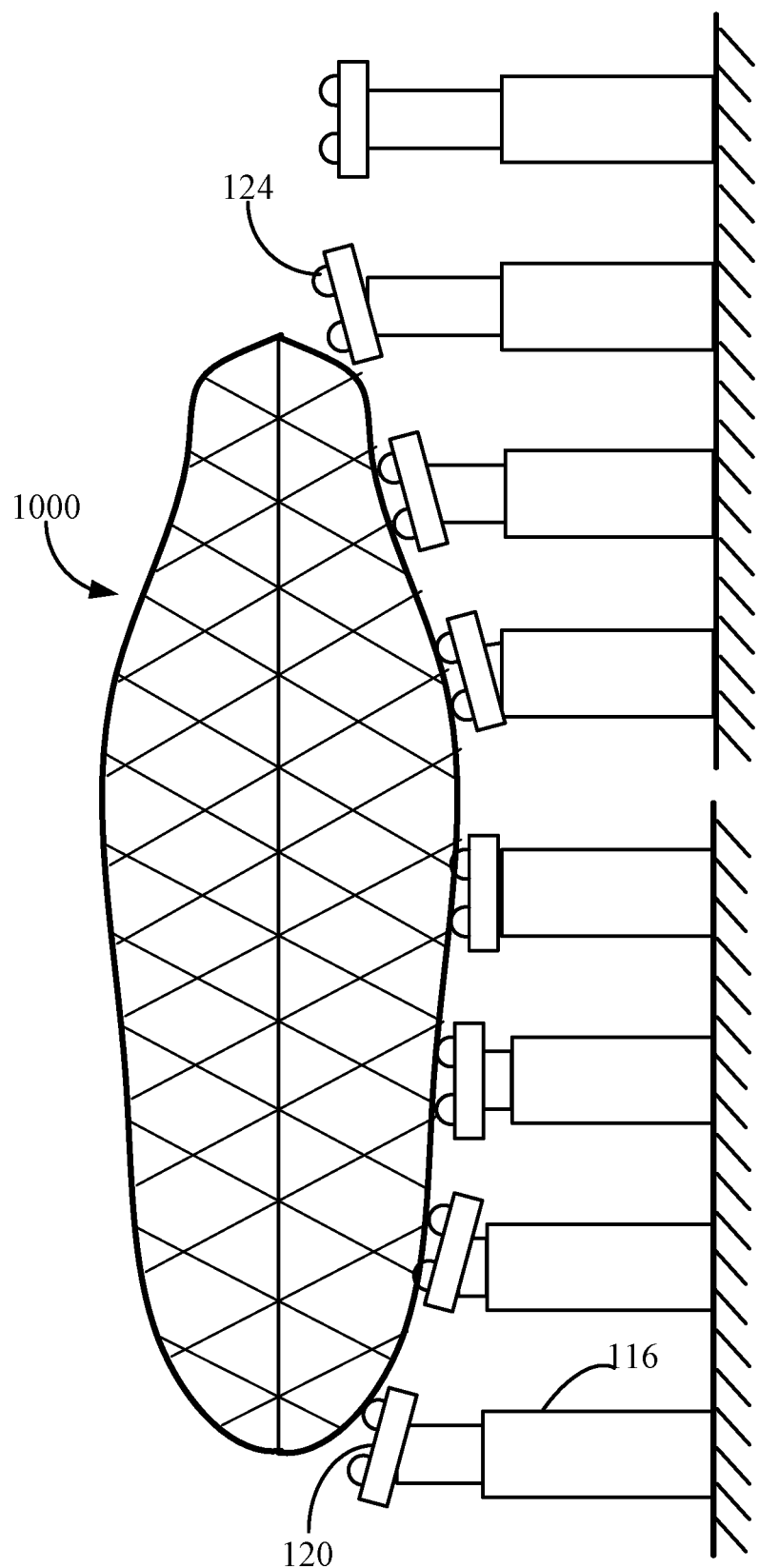
FIG. 10 is an example illustrating filament winding over a partially fabricated 3D object.

FIG. 10 is an example illustrating filament winding over a partially fabricated 3D object. Filament winding enhances the strength of the partially fabricated 3D object 1000 and presents a convenient substrate over which additional layers of 3D object material could be deposited. The 3D object could be repositioned for filament winding by different means, including operation of rollers, use of robotic arm, and similar processes.

Although the present description references the accompanying drawings and examples, it will be understood by those skilled in the art that various changes and modifications can be made thereto without departing from the technical spirit and scope of the present description.

We claim:

1. A method of manufacture of a 3D object from composite materials, comprising:
    providing a composite material including a multistrand filament with an instant hardening thixotropic matrix material surrounding the multistrand filament;
    providing an extrusion member configured to extrude the composite material; and
    providing a work surface comprising a plurality of discrete support columns terminated by a receiving surface and extruding at least one 3D object surface segment spanning in the air across at least a segment of a discrete work surface;
    wherein each receiving surface terminating an associated discrete support column is adjustably movable in height and angle by a computer to accept the orientation in space matching the orientation of the 3D object surface segment spanning in the air.

2. The method of claim 1, further comprising operating a source of curing energy to accelerate complete curing of the spanning in the air 3D object surface segment.

3. The method of claim 1, wherein the method includes the manufacture of a mold for casting 3D objects.

4. A method of enhanced multistrand filament preparation, comprising:
    providing a multistrand fibrous core material;
    conducting the multistrand fibrous material through a matrix material deposition device; and
    operating the matrix material deposition device to cover the multistrand fibrous material by a matrix material;
    wherein the matrix material is a thixotropic material that is configured to harden instantly in air so as to support instant hardening of the multistrand filament,
    the method further comprising:
    extruding the multistrand filament in a shape of a flat strip, and
    applying multiple coatings of different material to the sides of the flat strip.

5. The method of claim 4, wherein the applied multiple coatings of different material have different thicknesses.

6. The method of claim 4, wherein the fibrous core is at least one of a group of materials consisting of glass fiber, carbon fiber, aramid fiber, or poly(paraphenylene terephthalamide) strands.

7. The method of claim 4, wherein the matrix material is one of a group of materials consisting of a du-component epoxy, acrylic material, fast curing epoxy, polyester resin, and vinyl ester.

8. A method of enhanced multistrand filament preparation, comprising:
    providing a multistrand fibrous core material;
    conducting the multistrand fibrous material through a matrix material deposition device; and
    operating the matrix material deposition device to cover the multistrand fibrous material by a matrix material;
    wherein the matrix material is a thixotropic material that is configured to harden instantly in air so as to support instant hardening of the multistrand filament,
    the method further comprising:
    extruding the multistrand filament in a shape of a flat strip, and
    providing the flat strip with different qualities by applying to each side of the flat strip materials with different compositions.

* * * * *